(12) United States Patent
Benayoun et al.

(10) Patent No.: US 6,875,516 B2
(45) Date of Patent: Apr. 5, 2005

(54) SILICONE COMPOSITION CROSSLINKABLE BY DEHYDROGENATING CONDENSATION IN THE PRESENCE OF A METAL CATALYST

(75) Inventors: Jean-Paul Benayoun, Lyons (FR); Delphine Blanc-Magnard, Lyons (FR); Gérard Mignani, Lyons (FR); Christian Mirou, Lyons (FR)

(73) Assignee: Rhodia Chimie, Boulogne-Billancourt (FR)

( * ) Notice: Subject to any disclaimer, the term of this patent is extended or adjusted under 35 U.S.C. 154(b) by 0 days.

(21) Appl. No.: 10/124,270

(22) Filed: Apr. 18, 2002

(65) Prior Publication Data

US 2003/0228473 A1 Dec. 11, 2003

(51) Int. Cl.$^7$ .......................... B32B 25/20; C08G 77/08
(52) U.S. Cl. .................... 428/447; 428/159; 428/305.5; 428/308.4; 427/244; 427/373; 427/387; 525/474; 525/478; 528/15; 528/12; 528/31; 528/33
(58) Field of Search ................ 528/12, 15, 31, 528/33; 427/244, 373, 387; 525/474, 478; 428/159, 305.5, 308.4, 447; 252/382; 264/425

(56) References Cited

U.S. PATENT DOCUMENTS

| | | | |
|---|---|---|---|
| 2,967,170 A | | 1/1961 | Merker .................... 260/46.5 |
| 4,026,835 A | * | 5/1977 | Lee et al. .................... 521/108 |
| 4,252,933 A | * | 2/1981 | Sumida ........................ 528/33 |
| 4,262,107 A | | 4/1981 | Eckberg ........................ 528/15 |
| 4,417,024 A | | 11/1983 | Koda et al. ................... 524/861 |
| 4,442,040 A | | 4/1984 | Panster et al. ............... 260/429 |
| 4,525,391 A | * | 6/1985 | Eckberg ...................... 427/391 |
| RE32,245 E | * | 9/1986 | Grenoble et al. ............ 427/387 |
| 4,783,552 A | * | 11/1988 | Lo et al. ...................... 560/198 |
| 4,895,885 A | * | 1/1990 | Foster et al. .................. 524/99 |
| 5,108,791 A | * | 4/1992 | Chung et al. ............. 427/208.8 |
| 6,354,620 B1 | * | 3/2002 | Budden et al. ........... 280/728.1 |
| 2002/0013441 A1 | | 1/2002 | Muller et al. .................. 528/10 |
| 2002/0114891 A1 | | 8/2002 | Benayoun et al. ........... 427/387 |

FOREIGN PATENT DOCUMENTS

| | | |
|---|---|---|
| EP | 0 061 241 | 9/1982 |
| FR | 2 806 930 | 10/2001 |
| WO | WO 01/74938 | 10/2001 |

OTHER PUBLICATIONS

Curtis, "Metal–catalyzed oligomerization reactions of organosiloxanes," *Chemical Abstracts* 1984: 23040.

* cited by examiner

*Primary Examiner*—Jeffrey B. Robertson
(74) *Attorney, Agent, or Firm*—James C. Lydon

(57) ABSTRACT

An ≡SiH/≡SiOH silicone composition polymerizable/crosslinkable by dehydrogenating condensation in the presence of a catalyst judiciously selected to achieve at least one of the following: kinetics, concentration/efficiency ratio of the catalyst, cost, lowering of the catalyst activation temperature (room temperature), control of the release of gaseous hydrogen and the quality of the polymerized product and the crosslinked network, and finally limitation of the secondary reactions. This composition includes:

—A— at least one ≡SiH POS;

—B— at least one ≡SiOH POS;

—C— at least one metal catalyst selected from the group of organometallic complexes including at least one of the following metals: Ir, Ru, Mn;

—D— optionally at least one crosslinking inhibitor;

—E— optionally at least one POS resin; and

—F— optionally at least one filler.

Also disclosed is the catalyst —C— and processes which involve crosslinking of silicone by dehydrogenating condensation (non-stick coating on paper).

36 Claims, No Drawings

SILICONE COMPOSITION CROSSLINKABLE BY DEHYDROGENATING CONDENSATION IN THE PRESENCE OF A METAL CATALYST

The present invention relates to the field of the catalysis of dehydrogenating condensation reactions for the polymerization/crosslinking of silicone. The reactive species involved are monomers, oligomers and/or polymers of a polyorganosiloxane (POS) nature.

The reactive units in question in these species are on the one hand SiH units and on the other hand SiOH units.

Dehydrogenating condensation between these reactive silicone species and units leads to the formation of $\equiv$Si—O—Si$\equiv$ linkages and the release of gaseous hydrogen.

This dehydrogenating condensation is an alternative to the polymerization/crosslinking methods known in the field of silicones, namely the $\equiv$SiH/$\equiv$Si-alkenyl (vinyl) polyaddition method, and to the $\equiv$SiOR/$\equiv$SiOR polycondensation method (where R=alkyl). All these polymerization/crosslinking methods yield silicone products with a greater or lesser degree of polymerization and crosslinking and can be used in many applications: adhesives, sealing products, jointing products, adhesion finish, non-stick coatings, foams, etc.

The applications to which the invention relates more particularly are crosslinked silicone elastomer coatings useful as non-stick coatings on various solid substrates, for example flexible substrates (fibrous, e.g. made of paper or fabric) or non-fibrous flexible substrates such as polymer films (e.g. polyester or polyolefin), or else substrates made of aluminum or any other metal such as tinplate.

Another application to which the invention relates more especially is crosslinked silicone foams.

More precisely, the invention relates to siloxane compositions crosslinkable by dehydrogenating condensation, said compositions being of the type comprising:

—A— at least one organosiloxane monomer, oligomer and/or polymer having at least one $\equiv$SiH reactive unit per molecule;

—B— at least one organosiloxane monomer, oligomer and/or polymer having at least one $\equiv$SiOH reactive unit per molecule;

—C— at least one metal catalyst;

—D— optionally at least one crosslinking inhibitor;

—E— optionally at least one polyorganosiloxane (POS) resin;

—F— optionally at least one filler.

The invention further relates to the use of a novel dehydrogenating condensation catalyst based on organometallic complexes (Ir, Ru, Mn) for dehydrogenating condensation between silicone species (monomers/oligomers/polymers) which are intended to polymerize/crosslink with one another.

The invention further relates to the polymerization/crosslinking processes which involve the above-mentioned compositions, including the catalyst more especially selected according to the invention.

The invention finally relates to the production of non-stick silicone coatings or silicone foams crosslinked with the aid of silicone compositions comprising a particular organometallic catalyst (based on iridium, ruthenium or manganese).

French patent FR-B-1 209 131 discloses in particular the reaction of a silanol $Ph_2Si(OH)_2$ with a said organosiloxane $[(Me_2HSi)_2O]$, where Me=methyl and Ph=phenyl, by dehydrogenating condensation in the presence of chloro-platinic acid ($H_2PtCl_6 \cdot 6H_2O$), which yields a polydiorganosiloxane containing a unit D: —$R_2SiO_{2/2}$—, of the dimethyl or diphenyl type. This reaction produces a rapid release of hydrogen.

American patent U.S. Pat. No. 4,262,107 relates to a silicone composition of the polyorganosiloxane (POS) type; more precisely, said composition contains a polydimethyldisiloxane with silanol end groups and a crosslinking agent consisting of a POS with $\equiv$SiH units in the chain and with trimethylsilyl end groups, a catalyst consisting of a rhodium complex ($RhCl_3[(C_8H_{17})_2S]_3$), and a crosslinking inhibitor (for example diethyl maleate, diethylacetylene dicarboxylate, triallyl isocyanurate, vinyl acetate). This composition comprises 100 parts of POS with SiOH end groups, one to 20 parts of SiH POS, 10 to 500 parts per million of rhodium-based catalyst complex and, finally, 0 to 0.1 part by weight of inhibitor.

This silicone composition crosslinkable by dehydrogenating condensation in the presence of a rhodium complex can be used for the production of non-stick coatings on flexible substrates such as paper, plastic films or metal films. The crosslinking is carried out at a temperature of 150° C.

European patent application EP-A-1 167 424 describes the preparation of linear block silicone copolymers by the dehydrogenating condensation of POS polymers with silanol end groups and an aromatic POS with $\equiv$SiH end groups, in the presence of a metal catalyst. The POS with silanol end groups is a polydimethylsiloxane, the POS block with an SiH unit is e.g. 1,4-bis(dimethylsilylbenzene and the catalyst is e.g. a platinum complex such as Karstedt's catalyst.

Also mentioned as other dehydrogenating condensation catalysts are metal catalysts based on platinum, rhodium, palladium, plutonium and iridium, platinum being particularly preferred.

The copolymer block or blocks with $\equiv$SiH units have the particular feature of comprising a POS entity containing an $\equiv$SiAr—Si(R)$_2$—O— unit.

French patent application FR-A-2 806 930 relates to the use of boron derivatives of the tris(pentafluorophenyl)borane type as thermoactivatable catalysts for dehydrogenating condensation between a POS with SiH units, for example of the formula

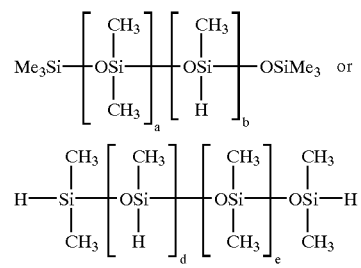

and a POS with $\equiv$SiOH end units, for example of the formula

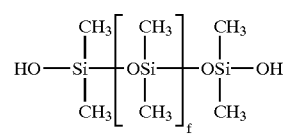

(a, b, d, e, f=positive natural integers).

Such silicone compositions crosslinkable by dehydrogenating condensation in the presence of Lewis acids of the boron derivative type can be used for the manufacture of non-stick coatings on flexible substrates, especially paper, and for the manufacture of crosslinked silicone foams in which the release of hydrogen and the quality of the crosslinking network are controlled.

This review of the state of the art relating to the catalysis of dehydrogenating condensation between ≡SiOH silicone species and ≡SiH silicone species shows that there is significant scope for the development of improvements, especially in terms of optimizing the reaction kinetics and the concentration/efficacy ratio of the catalyst, reducing the cost of the catalyst, lowering the activation temperature of the catalyst (mobilization of a small quantity of energy for catalyzing the dehydrogenating condensation: θ° C.<150 C, preferably below 100 C or even equal to room temperature), improving the control of the release of gaseous hydrogen and the quality of the polymerized product and the crosslinked network, and finally limiting the secondary reactions.

Thus one of the essential objectives of the present invention is to propose an ≡SiH/≡SiOH silicone composition polymerizable/crosslinkable by dehydrogenating condensation in the presence of a catalyst judiciously selected to achieve at least one of the specifications listed above.

Another essential objective of the invention is to propose a siloxane composition polymerizable/crosslinkable by dehydrogenating condensation to give a product other than linear copolyorganosiloxanes which comprises at least one ≡Si—Ar—Si≡ unit (Ar=divalent aromatic group), this composition containing a specific metal catalyst and optionally one or more additives selected from those generally known in the applications for which these compositions are intended, the singularity of this composition being the particularly advantageous quality/price ratio of the catalyst, which makes it possible at a low concentration to trigger the polymerization/crosslinking with good kinetics at a temperature below 150 C, preferably below 100 C or even in the order of room temperature.

Another essential objective of the present invention is to provide a process for the polymerization and/or crosslinking of a composition of the type referred to in the above statement of objectives, it being necessary for this process to be rapid, economic and advantageous in terms of the quality of the final product obtained.

Another essential objective of the invention is to provide a process for the production of at least one non-stick coating on a substrate (preferably flexible) which consists in using the above-mentioned crosslinking/polymerization process and/or the above-mentioned composition to improve viability without adversely affecting the qualities of the coating/substrate composite obtained.

Another essential objective of the invention is to provide a process for the production of at least one article made of crosslinked silicone foam which consists in using the above-mentioned crosslinking/polymerization process and/or the composition mentioned above in the objectives, this process making it possible to control the volume of gaseous hydrogen released and the quality of the crosslinked product.

These and other objectives are achieved by the present invention, which relates firstly to a polymerizable siloxane composition crosslinkable by dehydrogenating condensation to give a product other than linear block copolyorganosiloxanes which comprises at least one ≡Si—Ar—Si≡ unit (where Ar=aromatic group), this composition being of the type comprising:

—A— at least one organosiloxane monomer, oligomer and/or polymer having at least one ≡SiH reactive unit per molecule;

—B— at least one organosiloxane monomer, oligomer and/or polymer having at least one ≡SiOH reactive unit per molecule;

—C— at least one metal catalyst;

—D— optionally at least one crosslinking inhibitor;

—E— optionally at least one polyorganosiloxane (POS) resin; and

—F— Optionally at least one filler, wherein the catalyst —C— is selected from the group of organometallic complexes consisting of at least one of the following metals: Ir, Ru, Mn.

The use of such a catalyst complex —C—, even in small amounts (10 ppm), enables this dehydrogenating condensation reaction between ≡SiH and ≡SiOH siloxane species to be catalyzed under mild temperature conditions. Silicone networks or polymers are thus obtained in a few minutes, at room temperature, with variable SiH/≡SiOH ratios.

The catalysts judiciously selected according to the invention, especially the platinum catalysts, are efficient and economic.

In one preferred embodiment of the invention, the siloxane composition is wherein the catalyst —C— has formula (I) below:

$$\text{Ir}X(L)(L')_2 \tag{I}$$

in which:

Ir is an iridium atom of valency I or III;

X is a ligand with one electron, preferably selected from the group consisting of halogens, hydrogen, an acetate, a substituted or unsubstituted aromatic or heteroaromatic group, CN, RO, RS, R$_2$N and R$_2$P, where R corresponds to an alkyl, aryl or arylalkyl unit; and L and L' independently are a ligand with two electrons, preferably selected from the group consisting of: hydrocarbon radicals comprising at least one unit

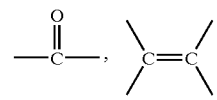

the radicals —PR'$_3$, —P(OR')$_3$, R'$_2$O, R'$_2$S, R'$_3$N, =CR'$_2$ where R' independently is a substituted or unsubstituted aromatic or heteroaromatic group or an alkyl, aryl or arylalkyl radical; and C$_n$H$_{n-1}$— (where n is a positive natural integer), preferably corresponding to C$_6$H$_5$—.

Among these iridium-based complexes, a catalyst —C— of formula I' is particularly preferred:

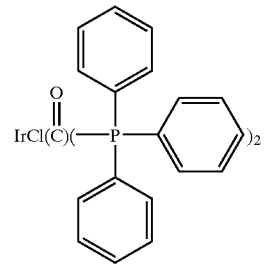

(I')

These iridium complexes have proved to be particularly remarkable in terms of cost/reactivity (selectivity/kinetics) ratios.

The catalyst (I') is also known as Vaska's complex, which had never been proposed for reactions between ≡SiH POS and ≡SiOH POS by dehydrogenating condensation.

Said complexes are also of interest because, at low concentration, they only require limited quantities of energy to activate the dehydrogenating condensation. In particular, they can actually be activated at a temperature below 150° C., preferably below 100° C. or even equal to room temperature.

They are of particularly interest for the preparation of silicone elastomer networks under mild and economic conditions. The applications targeted in this case involve especially non-stick paper, where it is desired to replace the current systems with less expensive systems, and silicone foams, where it is sought to control the release of hydrogen and the quality of the network. For the first application it is preferable to control the diffusion of hydrogen so as to prevent the formation of bubbles. For the second application it is necessary to control the size of the bubbles so as to optimize the properties of the final foam.

These results are all the more significant because the reactivity of the siloxane species, especially for forming non-linear (crosslinked) products, is not very high compared with that of the hydrogenosilanes and the alcohols in the dehydrogenating condensation.

From the quantitative point of view, the catalyst —C— based on ruthenium, manganese and, preferably, iridium is advantageously present in an amount varying between $1.10^{-6}$ and 5 and preferably between $1.10^{-6}$ and $1.10^{-3}$ parts by dry weight of organosiloxane monomer, oligomer and/or polymer to be reacted.

The siloxane species —A— with ≡SiH reactive units is preferably selected from those possessing at least one unit of formula (II) below and terminating with units of formula (III) below or cyclic units consisting of units of formula (II):

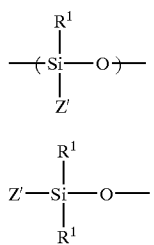

in which:
the symbols $R^1$ are identical or different and are:
a linear or branched alkyl radical containing 1 to 8 carbon atoms and optionally substituted by at least one halogen, preferably fluorine, the alkyl radicals preferably being methyl, ethyl, propyl, octyl and 3,3,3-trifluoropropyl,
an optionally substituted cycloalkyl radical containing between 5 and 8 cyclic carbon atoms,
an optionally substituted aryl radical containing between 6 and 12 carbon atoms, or
an aralkyl moiety having an alkyl moiety containing between 5 and 14 carbon atoms and an aryl moiety containing between 6 and 12 carbon atoms, and optionally substituted on the aryl moiety by halogens, alkyl radicals and/or alkoxy radicals containing 1 to 3 carbon atoms, and
the symbols Z are similar or different and are:
a hydrogen radical, or
a group defined in the same way as $R^1$ above,
with at least one of the symbols Z being H in each molecule.

As regards the siloxane species —B— with ≡SiOH reactive units, the ones selected within the framework of the invention are those possessing at least one unit of formula (IV) below and terminating with units of formula (V) below or cyclic units consisting of units of formula (IV):

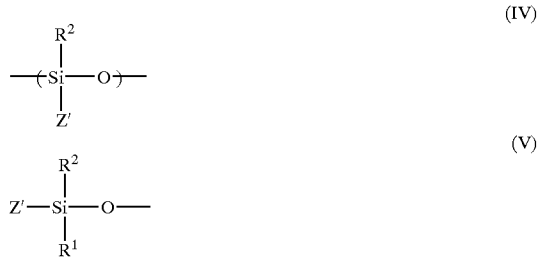

in which:
the symbols $R^2$ are identical or different and are:
a linear or branched alkyl radical containing 1 to 8 carbon atoms and optionally substituted by at least one halogen, preferably fluorine, the alkyl radicals preferably being methyl, ethyl, propyl, octyl and 3,3,3-trifluoropropyl,
an optionally substituted cycloalkyl radical containing between 5 and 8 cyclic carbon atoms,
an optionally substituted aryl radical containing between 6 and 12 carbon atoms, or
an aralkyl moiety having an alkyl moiety containing between 5 and 14 carbon atoms and an aryl moiety containing between 6 and 12 carbon atoms, and optionally substituted on the aryl moiety by halogens, alkyl radicals and/or alkoxy radicals containing 1 to 3 carbon atoms, and
the symbols Z' are similar or different and are:
a hydroxyl group, or
a group defined in the same way as $R^2$ above,
with at least one of the symbols Z' being OH in each molecule.

The species of types —A— and —B— can also include units called (Q) or (T), defined as indicated below, in their structure:

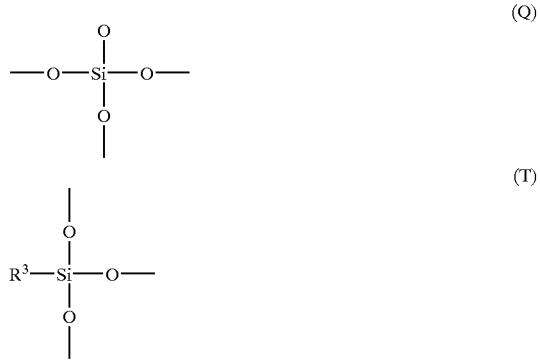

where $R^3$ can be one of the substituents proposed for $R^1$ or $R^2$.

In one advantageous variant of the invention, the polyorganosiloxanes —A— used contain 1 to 50 SiH units per molecule.

In one advantageous variant of the invention, the polyorganosiloxanes —B— used contain 1 to 50 SiOH units per molecule.

Particularly preferred derivatives —A— are the oligomers and polymers of general formula (VI):

$$R''^1-\underset{\underset{R'^1}{|}}{\overset{\overset{R'^1}{|}}{Si}}O-\left[\underset{\underset{H}{|}}{\overset{\overset{R'^1}{|}}{Si}}-O\right]_x\left[\underset{\underset{R'^1}{|}}{\overset{\overset{R'^1}{|}}{Si}}-O\right]_y\underset{\underset{R'^1}{|}}{\overset{\overset{R'^1}{|}}{Si}}-R''^1 \quad (VI)$$

in which:

x and y are each an integer or fraction varying between 0 and 200, and $R'^1$ and $R''^1$ independently of one another are:
- a linear or branched alkyl radical containing 1 to 8 carbon atoms and optionally substituted by at least one halogen, preferably fluorine, the alkyl radicals preferably being methyl, ethyl, propyl, octyl and 3,3,3-trifluoropropyl,
- an optionally substituted cycloalkyl radical containing between 5 and 8 cyclic carbon atoms,
- an optionally substituted aryl radical containing between 6 and 12 carbon atoms, or
- an aralkyl moiety having an alkyl moiety containing between 5 and 14 carbon atoms and an aryl moiety containing between 6 and 12 carbon atoms, and optionally substituted on the aryl moiety,
- it also being possible for $R''^1$ to be hydrogen, with the proviso that at least one of the radicals $R''^1$ (preferably both) are hydrogen when x=0.

Particularly preferred derivatives —B— are the oligomers and polymers of general formula (VII):

$$R''^2-\underset{\underset{R'^2}{|}}{\overset{\overset{R'^2}{|}}{Si}}O-\left[\underset{\underset{OH}{|}}{\overset{\overset{R'^2}{|}}{Si}}-O\right]_{x'}\left[\underset{\underset{R'^2}{|}}{\overset{\overset{R'^2}{|}}{Si}}-O\right]_{y'}\underset{\underset{R'^2}{|}}{\overset{\overset{R'^2}{|}}{Si}}-R''^2 \quad (VII)$$

in which:

x' and y' are each an integer or fraction varying between 0 and 1200, and $R'^2$ and $R''^2$ independently of one another are:
- a linear or branched alkyl radical containing 1 to 8 carbon atoms and optionally substituted by at least one halogen, preferably fluorine, the alkyl radicals preferably being methyl, ethyl, propyl, octyl and 3,3,3-trifluoropropyl,
- an optionally substituted cycloalkyl radical containing between 5 and 8 cyclic carbon atoms,
- an optionally substituted aryl radical containing between 6 and 12 carbon atoms, or
- an aralkyl moiety having an alkyl moiety containing between 5 and 14 carbon atoms and an aryl moiety containing between 6 and 12 carbon atoms, and optionally substituted . . . ,
- it also being possible for $R''^2$ to be OH, with the proviso that at least one of the radicals $R''^2$ (preferably both) are OH when x'=0.

Silicone derivatives —A— which are very particularly suitable for the invention are the following compounds:

$$Me_3Si-\left[O\underset{\underset{CH_3}{|}}{\overset{\overset{CH_3}{|}}{Si}}\right]_a\left[O\underset{\underset{H}{|}}{\overset{\overset{CH_3}{|}}{Si}}\right]_b-OSiMe_3 \quad S1$$

$$H-\underset{\underset{CH_3}{|}}{\overset{\overset{CH_3}{|}}{Si}}-\left[O\underset{\underset{CH_3}{|}}{\overset{\overset{CH_3}{|}}{Si}}\right]_c O\underset{\underset{CH_3}{|}}{\overset{\overset{CH_3}{|}}{Si}}-H \quad S2$$

$$H-\underset{\underset{CH_3}{|}}{\overset{\overset{CH_3}{|}}{Si}}-\left[O\underset{\underset{H}{|}}{\overset{\overset{CH_3}{|}}{Si}}\right]_d\left[O\underset{\underset{CH_3}{|}}{\overset{\overset{CH_3}{|}}{Si}}\right]_e O\underset{\underset{CH_3}{|}}{\overset{\overset{CH_3}{|}}{Si}}-H \quad S3$$

where a, b, c, d and e are numbers varying as follows:

in the polymer of formula S1:
$0 \leq a \leq 150$, preferably $0 \leq a \leq 100$ and particularly preferably $0 \leq a \leq 20$ and
$1 \leq b \leq 55$, preferably $10 \leq b \leq 55$ and particularly preferably $30 \leq b \leq 55$ in the polymer of formula S2:
$0 \leq c \leq 15$ in the polymer of formula S3:
$5 \leq d \leq 200$, preferably $20 \leq d \leq 50$ and
$2 \leq e \leq 50$, preferably $10 \leq e \leq 30$.

Silicone derivatives —B— which are very particularly suitable for the invention are the compounds of the formula $$HO-\underset{\underset{CH_3}{|}}{\overset{\overset{CH_3}{|}}{Si}}-\left[O\underset{\underset{CH_3}{|}}{\overset{\overset{CH_3}{|}}{Si}}\right]_f O\underset{\underset{CH_3}{|}}{\overset{\overset{CH_3}{|}}{Si}}-OH \quad S4$$

where $1 \leq f \leq 1200$, preferably $50 \leq f \leq 400$ and particularly preferably $150 \leq f \leq 250$.

Since the siloxane species —A— and —B— are oligomers and polymers, they can be described as indicated below.

The POS —A— can be linear (e.g. (VI)), branched or cyclic. For economic reasons, its viscosity is preferably below 100 mPa.s; the identical or different organic radicals are preferably methyl, ethyl and/or phenyl. If said POS is linear, the hydrogen atoms of the ≡SiH groups are bonded directly to the silicon atoms located at the end(s) of the chain and/or in the chain.

Polymethylhydrogenosiloxanes with trimethylsiloxy and/or hydrogenodimethylsiloxy end groups are examples of a linear constituent —A—.

Cyclic polymers which may be mentioned are those of the following formulae:

[OSi(CH$_3$)H]$_4$; [OSi(CH$_3$)H]$_5$; [OSi(CH$_3$)H]$_3$; [OSi(CH$_3$)H]$_8$; [OSi(C$_2$H$_5$)H]$_3$.

The following may be mentioned as concrete examples of branched polymers:

CH$_3$Si[CH$_3$]$_3$[OSi(CH$_3$)$_2$H]$_2$; Si[OSi(CH$_3$)(C$_2$H$_5$)H][OSi(Ch$_3$)$_2$H]$_3$, as well as polymers consisting of SiOH$_2$ and H(CH$_3$)$_2$SiO$_{0.5}$ units with a CH$_3$/Si ratio of 1 to 1.5.

The constituent —B— can have a viscosity of as much as 200,000 mPa.s. For economic reasons, the chosen constituent generally has a viscosity in the order of 20 to 10,000 mPa.s.

The identical or different organic groups generally present in the α,ω-hydroxylated oils or gums are methyl, ethyl, phenyl and trifluoropropyl radicals. Preferably, at least 80% by number of said organic groups are methyl groups bonded directly to the silicon atoms. α,ω-Bis(hydroxy) polydimethylsiloxanes are more especially preferred within the framework of the present invention.

The resins —B— with silanol groups have at least one of the units $R'SiO_{0.5}$ (unit M) and $R'^2SiO$ (unit D), in association with at least one of the units $R'SiO_{0.5}$ (unit T) and $SiO_2$ (unit Q), per molecule. The radicals R' generally present are methyl, ethyl, isopropyl, tert-butyl and n-hexyl. Examples of resins which may be mentioned are the resins MQ(OH), MDQ(OH), TD(OH) and MDT(OH).

It is possible to use solvents for the POS —A— or —B— in order to adjust the viscosity of the composition. Examples which may be mentioned of conventional such solvents for silicone polymers are solvents of the aromatic type such as xylene and toluene, saturated aliphatic solvents such as hexane, heptane, white-spirit®, tetrahydrofuran and diethyl ether, and chlorinated solvents such as methylene chloride and perchloroethylene. Preferably, however, no solvent will be used within the framework of the present invention.

The respective amounts of siloxane species —A— and —B— are also a decisive factor in the successful implementation of the dehydrogenating condensation of the composition according to the invention.

Thus the ≡SiH/≡SiOH ratio is advantageously between 1 and 100, preferably between 10 and 50 and particularly preferably between 15 and 45.

The composition according to the invention can also comprise at least one crosslinking inhibitor —D—. The latter is preferably selected from acetylenic alcohols (ethynylcyclohexanol: ECH) and/or diallyl maleates and/or triallyl isocyanurates and/or dialkyl maleates (diethyl maleates and/or dialkylalkynyl dicarboxylates) (diethylacetylene dicarboxylate), or alternatively from the following compounds:

polyorganosiloxanes which are advantageously cyclic and substituted by at least one alkenyl, tetramethylvinyltetrasiloxane being particularly preferred, pyridine, phosphines and organic phosphites, unsaturated amides, and alkyl maleates.

The acetylenic alcohols (cf. FR-B-1 528 464 and FR-A-2 372 874) which are among the preferred thermal blockers of hydrosilylation reactions have the formula

in which:

$R^1$ is a linear or branched alkyl radical or a phenyl radical; and $R^2$ is H, a linear or branched alkyl radical or a phenyl radical;

it optionally being possible for the radicals $R^1$ and $R^2$ and the carbon atom located in have of the triple bond to form a ring; and the total number of carbon atoms contained in $R^1$ and $R^2$ being at least 5, preferably 9 to 20.

Said alcohols are preferably selected from those having a boiling point above 250° C. Examples which may be mentioned are:

1-ethynylcyclohexan-1-ol;
3-methyldodec-1-yn-3-ol;
3,7,11-trimethyldodec-1-yn-3-ol;
1,1-diphenylprop-2-yn-1-ol;
3-ethyl-6-ethylnon-1-yn-3-ol;
3-methylpentadec-1-yn-3-ol.

These α-acetylenic alcohols are commercial products.

Such a retarder is present in an amount of at most 3000 ppm, preferably in an amount of 100 to 2000 ppm, based on the total weight of the organopolysiloxanes —A— and —B—.

The composition according to the invention can also comprise one or more POS resins —E—. These resins are well-known branched POS oligomers or polymers which are available commercially. They are present in the form of solutions, preferably siloxane solutions. Their structure contains at least two different units selected from those of the formulae $R'^3SiO_{0.5}$ (unit M), $R'^2SiO$ (unit D), $R'SiO_{1.5}$ (unit T) and $SiO_2$ (unit Q), at least one of these units being a unit T or Q.

The radicals R' are identical or different and are selected from linear or branched $C_1$–$C_6$ alkyl radicals, $C_2$–$C_4$ alkenyl radicals, phenyl and 3,3,3-trifluoropropyl. Examples of alkyl radicals R' which may be mentioned are methyl, ethyl, isopropyl, tert-butyl and n-hexyl radicals and examples of alkenyl radicals R which may be mentioned are vinyl radicals.

It must be understood that some of the radicals R' in the POS resins —E— of the above-mentioned type are alkenyl radicals.

Examples which may be mentioned of branched organopolysiloxane oligomers or polymers —E— are the resins MQ, the resins MDQ, the resins TD and the resins MDT, it being possible for the alkenyl groups to be carried by the units M, D and/or T. Examples which may be mentioned of particularly suitable resins —E— are the vinylic resins MDQ or MQ in which the proportion by weight of vinyl groups is between 0.2 and 10% by weight, these vinyl groups being carried by the units M and/or D.

This structural resin —E— is advantageously present in a concentration of between 10 and 70% by weight, preferably of between 30 and 60% by weight and particularly preferably of between 40 and 60% by weight, based on all the constituents of the composition.

The composition according to the invention can also contain a filler —F—, which is preferably a mineral filler selected from siliceous or non-siliceous materials. When siliceous materials are present, they can act as reinforcing or semi-reinforcing fillers.

The reinforcing siliceous fillers are selected from colloidal silicas, powdered calcined and precipitated silicas, or mixtures thereof.

These powders have a mean particle size generally below 0.1 μm and a BET specific surface area above 50 m²/g, preferably of between 100 and 300 m²/g.

It is also possible to use semi-reinforcing siliceous fillers such as diatomaceous earths or ground quartz.

As far as the non-siliceous mineral materials are concerned, these can be present as semi-reinforcing or bulking mineral fillers. Examples of these non-siliceous fillers, which can be used by themselves or in a mixture, are carbon black, titanium dioxide, aluminum oxide, hydrated alumina, expanded vermiculite, zirconia, a zirconate, non-expanded vermiculite, calcium carbonate, zinc oxide, mica, talcum, iron oxide, barium sulfate and slaked lime. These fillers have a particle size generally of between 0.001 and 300 μm and a BET surface area below 100 m²/g.

In practice, the filler employed is a silica, but this does not imply a limitation.

The filler can be treated with any appropriate compatibilizing agent, especially hexamethyldisilazane. Further details on this subject may be obtained by reference to patent FR-B-2 764 894, for example.

As far as the weight of filler is concerned, it is preferred to use an amount of between 5 and 30% by weight, preferably of between 7 and 20% by weight, based on all the constituents of the preparation.

Of course, the composition can be enriched with all kinds of additives, depending on the intended final applications.

In the non-stick application to flexible substrates (paper or polymer film), the composition can comprise an adhesion modulating system selected from the known systems such as those described in French patent FR-B-2 450 642, patent U.S. Pat. No. 3,772,247 or European patent application EP-A-0 601 938. Examples which may be mentioned are modulators based on:

- 96 to 85 parts by weight of at least one reactive polyorganosiloxane resin (A) of the type $MD^{Vi}Q$, $MM^{Vi}Q$, $MD^{Vi}T$, $MM^{Hexenyl}Q$ or $MM^{Allyloxypropyl}Q$;
- 4 to 15 parts by weight of at least one non-reactive resin (B) of the type MD'Q, MDD'Q, MDT', MQ or MDQ.

Among the additives used in other applications, it is possible in particular to envisage stabilizing additives such as agents of the tertiary or secondary amine type (cf. WO-A-98/07798; EP-A-162 524; EP-A-0 263 561).

Other functional additives in this composition can be bactericides, photo-sensitizers, fungicides, corrosion inhibitors, antifreezes, wetting agents, antifoams, synthetic latices, colorants or acidifying agents.

Other conventional additives which may be mentioned are adhesion promoters such as those comprising at least one alkoxylated organosilane, at least one epoxidized organosilicon compound and at least one metal chelate and/or metal alkoxide, for example (VinylTriMethoxySilane)/(GLYcidoxypropyltriMethOxysilane)/(tert-butyl titanate).

This composition can be a solution or an emulsion. In the latter case, it can contain at least one surfactant and optionally at least one pH buffer such as $HCO_3^-/CO_3^{2-}$ and/or $H_2PO_4^-/HPO_4^{2-}$.

Another way of defining the invention consists in apprehending it from the point of view of the use of at least one catalyst —C—, selected from the group of organometallic complexes comprising at least one of the following metals: Ir, Ru, Mn, this catalyst —C— being as defined above, as a thermoactivatable catalyst for dehydrogenating condensation between on the one hand at least one organosiloxane monomer, oligomer and/or polymer having at least one ≡SiH reactive unit per molecule, and on the other hand at least one organosiloxane monomer, oligomer and/or polymer having at least one ≡SiOH reactive unit per molecule, to give a product which also optionally comprises at least one crosslinking inhibitor, at least one polyorganosiloxane (POS) resin and at least one filler.

According to another of its features, the present invention relates to a process for the polymerization and/or crosslinking of a siloxane composition comprising:

—A— at least one organosiloxane monomer, oligomer and/or polymer having at least one ≡SiH reactive unit per molecule;

—B— at least one organosiloxane monomer, oligomer and/or polymer having at least one ≡SiOH reactive unit per molecule;

—C— at least one metal catalyst;

—D— optionally at least one crosslinking inhibitor;

—E— optionally at least one polyorganosiloxane (POS) resin; and

—F— optionally at least one filler, wherein the compounds —A— and —B— are caused to undergo a dehydrogenating condensation with the aid of a catalyst —C— of formula (I) below:

$$IrX(L)(L')_2 \qquad (I)$$

in which:

Ir is an iridium atom of valency I or III;

X is a ligand with one electron, preferably selected from the group comprising halogens, hydrogen, an acetate, a substituted or unsubstituted aromatic or heteroaromatic group, CN, RO, RS, $R_2N$ and $R_2P$, where R corresponds to an alkyl, aryl or arylalkyl unit; and L and L' independently are a ligand with two electrons, preferably selected from the group comprising:
hydrocarbon radicals comprising at least one unit

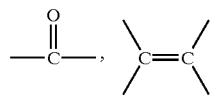

the radicals

—PR'$_3$, —P(OR')$_3$, R'$_2$O, R'$_2$S, R'$_3$N, =CR'$_2$ where R' independently is a substituted or unsubstituted aromatic or heteroaromatic group or an alkyl, aryl or arylalkyl radical; and $C_nH_{n-1}$— (where n is a positive natural integer), preferably corresponding to $C_6H_5$—.

There are two possible embodiments for the addition of the catalyst according to the invention.

Either said catalyst can be added to the mixture of the compounds A and B, for example polymers of the type S1, S2 or S3 with a polymer of the type S4, or, preferably, it can first be mixed with the compound B, for example a polymer of the type S4, and then brought into contact with the compound A, for example a polymer S1, S2 or S3.

Whichever variant is in question, the catalyst can be used as such or in solution in a solvent.

In general, the mixtures are produced by agitation at room temperature.

The catalyst solution can be used for example to prepare a bath with the monomer(s), oligomer(s) and/or polymer(s) to be polymerized and/or crosslinked by dehydrogenating condensation, so that the concentration of the catalyst(s) present is between 0.01 and 5% by weight, preferably between 0.05 and 0.5%, in said bath.

The solvents which can be used for the catalysts are very numerous and varied and are chosen according to the catalyst used and the other constituents of the composition prepared in this way. In general, the solvents can be alcohols, esters, ethers, ketones, trace amounts of water, and carbonates.

The alcohols commonly employed are paratolylethanol, isopropylbenzyl alcohol, benzyl alcohol, methanol, ethanol, propanol, isopropanol and butanol. The ethers commonly used are 2-methoxyethanol, 2-ethoxyethanol, diethylene glycol and di-n-butyl ether. The customary esters are dibutyl maleate, dimethylethyl malonate, methyl salicylate, dioctyl adipate, butyl tartrate, ethyl lactate, n-butyl lactate and isopropyl lactate. Other solvents which can be used for the catalyst bath and which fall into the other categories of solvents mentioned above are acetonitrile, benzonitrile, acetone, cyclohexanone, toluene and tetrahydrofuran.

The silicone composition according to the invention, which can be used especially as a base for the production of non-stick coatings of a water-repellent nature, is prepared using the mixing means and methodologies well known to those skilled in the art, whether applied to compositions with or without solvents or to emulsions.

The invention further relates to a process for the production of at least one non-stick coating on a substrate, preferably a flexible substrate, wherein it consists essentially in applying to this substrate a composition as defined above, preferably using POS —A— and —B— as defined above, and then in causing crosslinking to occur.

In this process, the compositions can be applied to flexible substrates or materials with the aid with the aid of devices used on industrial paper coating machines, such as a coating head with five rolls, and airbrush or equalizing bar systems, and then cured by passage through tunnel ovens heated to 70–200° C.; the passage time in these ovens depends on the temperature and is generally in the order of 5 to 15 seconds at a temperature in the order of 100° C., and in the order of 1.5 to 3 seconds at a temperature in the order of 180° C.

Said compositions can be deposited on any flexible material or substrate such as various types of paper (supercalendered, coated, glassine), cardboard, cellulose sheeting, metal foil or plastic film (polyester, polyethylene, polypropylene, etc.).

The amounts of compositions deposited are in the order of 0.5 to 2 g per m² of surface to be treated, which corresponds to the deposition of layers in the order of 0.5 to 2 µm.

The materials or substrates coated in this way can subsequently be brought into contact with any pressure-sensitive adhesives based on rubber, acrylic or the like. The adhesive is then easily detachable from said substrate or material.

The flexible substrates coated with a non-stick silicone film can be for example:
  an adhesive tape whose inner face is coated with a layer of pressure-sensitive adhesive and whose outer face carries the non-stick silicone coating; or
  a paper or a polymer film for protecting the adhesive face of a self-adhesive or pressure-sensitive adhesive element; or
  a polymer film of the polyvinyl chloride (PVC), polypropylene, polyethylene or polyethylene terephthalate type.

The invention further relates to a process for the production of at least one article made of crosslinked silicone foam, wherein it consists essentially in crosslinking a composition as defined above, preferably using POS A and B as defined above, and ensuring that at least part of the gaseous hydrogen formed is not released from the reaction medium.

The compositions according to the invention are useful in the field of non-stick coatings on paints, the encapsulation of electrical and electronic components, coatings for textiles and the sheathing of optical fibers.

The invention further relates to any coatings obtained by the crosslinking of a composition comprising siloxane species —A— with SiH reactive units of type S1, S2 or S3, as defined above, to siloxane species —B— of type S4, as defined above.

In particular, the invention relates to a coating obtained by the crosslinking (dehydrogenating condensation) of a composition comprising:
  at least one POS —A— selected from the compounds of the formulae

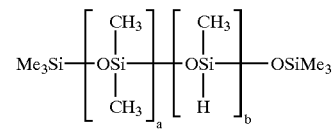

S1

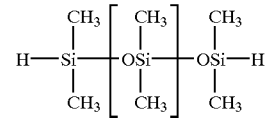

S2

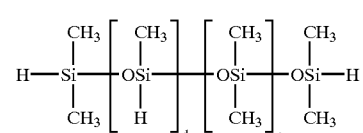

S3 where a, b, c, d and e are numbers varying as follows:
in the polymer of formula S1:
  $0 \leq a \leq 150$ and
  $1 \leq b \leq 55$
in the polymer of formula S2:
  $0 \leq c \leq 15$
in the polymer of formula S3:
  $5 \leq d \leq 200$ and
  $2 \leq e \leq 50$;
at least one POS —B— selected from the compounds of the formula

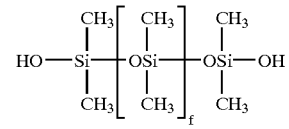

S4 where $1 \leq f \leq 1200$;
at least one metal catalyst —C— of formula (I) below:

(I)

in which:
Ir is an iridium atom of valency I or III;
X is a ligand with one electron, preferably selected from the group comprising halogens, hydrogen, an acetate, a substituted or unsubstituted aromatic or heteroaromatic group, CN, RO, RS, $R_2N$ and $R_2P$, where R corresponds to an alkyl, aryl or arylalkyl unit; and
L and L' independently are a ligand with two electrons, preferably selected from the group comprising: hydrocarbon radicals comprising at least one unit

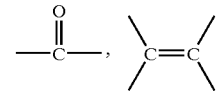

the radicals

where R' independently is a substituted or unsubstituted aromatic or heteroaromatic group or an alkyl, aryl or arylalkyl radical; and $C_nH_{n-1}$— (where n is a positive natural integer), preferably corresponding to $C_6H_5$—;

optionally at least one crosslinking inhibitor;

optionally at least one polyorganosiloxane (POS) resin; and optionally at least one filler.

These coatings can be of the following types: varnish, adhesive coating, non-stick coating and/or ink.

The invention further relates to:

any articles consisting of a solid material, at least one surface of which is coated with the thermally crosslinked and/or polymerized composition referred to above; and the crosslinked silicone foam obtained by the crosslinking of a composition comprising the species S1 and/or S2 and/or S3 as components —A— is the species of type S4 as components —B—, and the production of gaseous hydrogen by dehydrogenating condensation.

The composition on which this foam is based comprises:

at least one POS —A— selected from the compounds of the formulae

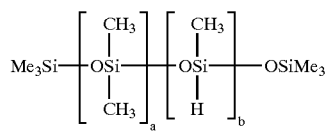
S1

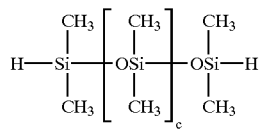
S2

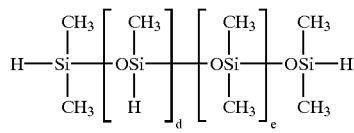
S3 where a, b, c, d and e are numbers varying as follows:

in the polymer of formula S1:
$0 \leq a \leq 150$ and
$1 \leq b \leq 55$ in the polymer of formula S2:
$0 \leq c \leq 15$ in the polymer of formula S3:
$5 \leq d \leq 200$ and
$2 \leq e \leq 50$;

at least one POS —B— selected from the compounds of the formula

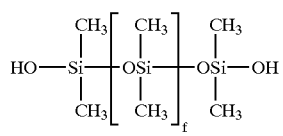
S4 where $1 \leq f \leq 1200$;

at least one metal catalyst —C— of formula (I) below:

$$IrX(L)(L')_2 \quad (I)$$

in which:

Ir is an iridium atom of valency I or III;

X is a ligand with one electron, preferably selected from the group comprising halogens, hydrogen, an acetate, a substituted or unsubstituted aromatic or heteroaromatic group, CN, RO, RS, $R_2N$ and $R_2P$, where R corresponds to an alkyl, aryl or arylalkyl unit; and L and L' independently are a ligand with two electrons, preferably selected from the group comprising:

hydrocarbon radicals comprising at least one unit

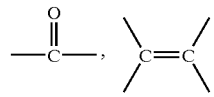

the radicals

where R' independently is a substituted or unsubstituted aromatic or heteroaromatic group or an alkyl, aryl or arylalkyl radical; and $C_nH_{n-1}$— (where n is a positive natural integer), preferably corresponding to $C_6H_5$—;

optionally at least one crosslinking inhibitor;

optionally at least one polyorganosiloxane (POS) resin; and optionally at least one filler.

The present invention further relates to the resins or polymers obtainable from the compositions described above.

EXAMPLES

I—Equipment and Methods

The following polyorganosiloxane polymers are used:

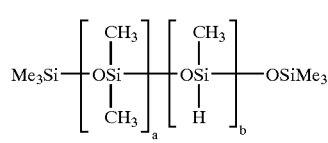
S1

$0 \leq a \leq 20$ and
$30 \leq b \leq 55$

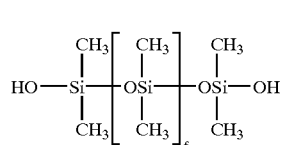
S4 where $150 \leq f \leq 250$.

The iridium concentration is calculated relative to the total weight of the mixture of SiH and SiOH oils. The iridium catalyst used is Vaska's complex dissolved in desulfurized toluene.

II—Tests for Characterizing the Crosslinked Silicone Coating on the Substrate

1) Crosslinking: The level of polymerization of the coating at the outlet of the coating machine is described by means of a number of specialized tests: "smear", where the oily character of the surface is described by passing the finger over the silicone-coated surface.
2) The "rub-off" test, which characterizes the grip to the substrate. In practice, the surface of the coating is rubbed with the finger and the number of passes after which the coating degrades/detaches is noted. A score of 10 (10 passes) is considered acceptable for the application: POSITIVE GRIP.
3) Migration test by dewetting: This test makes it possible to verify that the polymerization of a silicone layer deposited on the surface of a paper or film is complete (specialized test).

3.1—Principle

Quantitative assessment of the degree of polymerization of a silicone layer on a paper or film by transfer of the unpolymerized silicone to an adhesive tape placed in contact with the silicone coating beforehand.

3.2—Products Used

3 M "scotch" adhesive tape, reference 610, width: 25 mm (specify if another type of adhesive tape is used).

Commercial test ink with a surface tension between that of the silicone ($\approx$20 dynes/cm) and that of the adhesive ($\approx$40 dynes/cm).

Example: inks of the SHERMAN or FERARINI & BENELI mark with a surface tension of 30 dynes/cm and a viscosity of 2 to 4 mPa/s.

This ink is supplied with a small application brush (specify if another type of ink is used) (ink used daily: to be used within 3 months).

3.3—Procedure

Select an approximately 20×5 cm sample of the silicone-coated paper to be characterized, taken in the long direction (machine direction).

Cut an $\approx$15 cm length of adhesive tape and then place its adhesive side wrinkle-free on the paper to be checked, pressing 10 times by sliding the finger along the adhesive tape.

Remove the adhesive tape and place it flat with the adhesive side up.

Using the small brush provided for this purpose, deposit a trace of ink over an approximately 10 cm length of the adhesive side of the tape. Start the stopwatch immediately.

It is considered that the phase of the dewetting phenomenon is entered when the ink line becomes discontinuous ("chain of droplets"). Stop the stopwatch as soon as droplets begin to form.

The ink must be deposited on the adhesive side of the tape within 2 minutes of the silicone coating.

3.4—Expression of the Results

If the result obtained is <10 seconds, it is considered that there is a migration of silicone onto the adhesive and that the polymerization is not complete.

A score of 0 to 10 will be given, corresponding to the time elapsing in seconds before the dewetting phenomenon is observed.

If the result obtained is 10 seconds, it is considered that the polymerization is complete. A score of 10 will be given in this case, indicating that the result is very good.

Record the score obtained and the ink used (name, mark, surface tension, viscosity).

3.5—Processing of the Measurements and Precision of the Result

Two possible cases can arise:

a) N>10, in which case the crosslinking is complete.
b) N<10 and, if the test is repeated several times within a few seconds of the first test, the score changes and stabilizes at a value of >10. In this case there is an inhibition phenomenon preventing the silicone from crosslinking properly. This inhibition can be due e.g. to an exudate or additive in the coated paper or film.

Examples 1, 2 and 3 demonstrate the efficacy of Vaska's catalyst in the dehydrogenating condensation reaction and the role of ethynylcyclohexanol (ECH) as reaction retarder. Examples 4 and 5 show the activity of other complexes based on iridium and ruthenium.

Example 1

In a 30 ml flask equipped with a magnetic stirrer, 4 mg ($5.1 \times 10^{-3}$ mmol) of Vaska's complex, $IrCl(CO)(TPP)_2$, are diluted in 0.5 ml of desulfurized toluene. 10 g of a preformed mixture of oil formed of POS S4 with SiOH units (9.86 g, 1.22 meq SiOH) and hydrogenated polyorganosiloxane (POS) of Formula S1 defined at page 22, line 26 to page 23, line 5 and infra at page 27, line 24 with $\equiv$SiH units (0.14 mg, 2.19 meq $\equiv$SiH) are added to the above solution. The SiH/SiOH ratio is 1.8 and the iridium concentration is 100 ppm.

After stirring, the solidification time is measured; in this case the gelling time is less than 3 minutes at room temperature.

Example 2

In a 30 ml flask equipped with a magnetic stirrer, 4 mg ($5.1 \times 10^{-3}$ mmol) of Vaska's complex, $IrCl(CO)(TPP)_2$, are diluted in 1 ml of desulfurized toluene. 10 g of a preformed mixture of POS S4 oil with $\equiv$SiOH units (9.85 g, 1.22 meq $\equiv$SiOH), hydrogenated polyorganosiloxane (POS) oil of Formula S1 defined at page 23 supra with $\equiv$SiH units (0.14 mg, 2.19 meq $\equiv$SiH) and ethynylcyclohexanol (0.01 g, 0.101 mmol) are added to the above solution. The $\equiv$SiH/$\equiv$SiOH ratio is 1.8, the iridium concentration is 100 ppm and the ECH/Ir ratio is 20.

After stirring, the gelling time is more than 2 hours at room temperature and is equal to 30 minutes at 80° C.

Example 3

Example 3 demonstrates the efficacy of Vaska's complex for different SiH/SiOH ratios and different iridium concentrations.

In a flask equipped with a magnetic stirrer, a given amount of Vaska's complex, $IrCl(CO)(TPP)_2$, is diluted in desulfurized toluene. A preformed mixture of POS S4 oil with $\equiv$SiOH units and POS S1 oil with $\equiv$SiH units is added to the above solution (the $\equiv$SiH/$\equiv$SiOH ratio and the iridium concentration are variable and are collated in the Table below). After stirring, the solidification time at room temperature is measured:

TABLE I

| Example | ppm Ir | SiH/SiOH | Solidification time at room temperature |
|---|---|---|---|
| 3.1 | 100 | 1.8 | 30 s |
| 3.2 | 10 | 1.8 | 1 min |
| 3.3 | 1 | 1.8 | 2 min |
| 3.4 | 100 | 20 | <<10 s |
| 3.5 | 10 | 20 | <20 s |
| 3.6 | 1 | 20 | 20 s |

Example 4

In a 30 ml flask equipped with a magnetic stirrer, an iridium-based complex diluted in a solvent is mixed with a preformed solution of POS S4 oil with $\equiv$SiOH units and hydrogenated polyorganosiloxane (POS) oil of Formula S1 defined at page 23 supra. The $\equiv$SiH/$\equiv$SiOH ratio is 1.8 and the Ir/SiOH ratio is equal to $4.2 \times 10^{-3}$ (100 ppm of iridium). After stirring, the solidification time is measured at room temperature or at 80° C.

The results are collated in Table II below:

TABLE II

| | Solidification time | |
|---|---|---|
| Iridium-based catalyst | Room temperature | 80° C. |
| IrCl(CO)(TPP)$_2$ | 3' | — |
| Ir(CO)$_2$(acac) | >2 h | 10–15 min |
| IrH(Cl)$_2$(TPP)$_3$ | >2 h | 15–30 min |
| [IrCl(cyclooctene)$_2$]$_2$ | >2 h | 15–30 min |
| IrI(CO)(TPP)$_2$ | >2 h | 15–30 min |
| [Ir(P(cyclo)$_3$)(cod)(pyr)]$^+$ PF$_6^-$ | >2 h | 20 min |
| IrH(CO)(TPP)$_3$ | >2 h | 20 min |

Example 5

In a 30 ml flask equipped with a magnetic stirrer, a ruthenium-based complex diluted in a solvent is mixed with a preformed solution of POS S4 oil with SiOH units and POS S1 oil with $\equiv$SiH units. The $\equiv$SiH/$\equiv$SiOH ratio is 1.8 and the Ru/$\equiv$SiOH ratio is equal to $4.2 \times 10^{-3}$ (about 50 ppm of ruthenium). After stirring, the solidification time is measured at room temperature or at 80° C.

The results are collated in Table III below:

TABLE III

| | Solidification time | |
|---|---|---|
| Ruthenium-based catalyst | Room temperature | 80° C. |
| Ru$_3$(CO)$_{12}$ | >2 h | 1–2 h |
| [RuCl$_2$(CO)$_3$]$_2$ | >2 h | 1–2 h |
| RuH$_2$(CO)(TPP)$_3$ | >2 h | 3 h |
| RuH$_2$(TPP)$_4$ | >2 h | ~9 h |

AAP Application Tests on a Rotomec Pilot Apparatus

The following Examples (6 to 9) demonstrate the value of the invention in thin layer applications: the results obtained with a $\equiv$SiH/$\equiv$SiOH ratio of 20 are advantageous both with 100 ppm of iridium (Example 6) and with 10 ppm (Example 7); likewise, an $\equiv$SiH/$\equiv$SiOH ratio of 40 (Example 8) gives good results, even when the paper speed in increased to 150 m/min (Example 9). As a Duplicate Example, a comparative experiment was performed using a platinum-based catalyst (Duplicate Example 7).

Operating Protocol followed for Examples 6 to 9 and Duplicate Example 7

A given amount of a catalyst prediluted in desulfurized toluene is added to 100 g of a mixture of POS S1 & S4 oils and ECH. After stirring, a thin layer of this mixture is applied to a "glassine® 2010" substrate by means of a Rotomec® pilot apparatus. The coated face is the outer face and the oven temperature is 185° C.

Example 6

40 mg (100 ppm of Ir) of Vaska's catalyst prediluted in 3 ml of desulfurized toluene are added to 100 g of a mixture A of POS S1 & S4 oils and ECH ($\equiv$SiH/$\equiv$SiOH=20). After stirring, a thin layer of this mixture is applied; the conditions and results are collated in Table IV below.

Mixture A: 0.173 g of ECH+36.52 g of POS S1+239.6 g of POS S4

Example 7

4 mg (10 ppm of Ir) of Vaska's catalyst prediluted in 3 ml of desulfurized toluene are added to 100 g of a mixture B of POS S1 & S4 oils and ECH ($\equiv$SiH/$\equiv$SiOH=20). After stirring, a thin layer of this mixture is applied; the conditions and results are collated in Table IV below.

Mixture B: 0.180 g of ECH+38.0 g of POS S1+247.8 g of POS S4

Example 8

40 mg (100 ppm of Ir) of Vaska's catalyst prediluted in 3 ml of desulfurized toluene are added to 100 g of a mixture C of POS S1 & S4 oils and ECH (($\equiv$SiH/$\equiv$SiOH=40). After stirring, a thin layer of this mixture is applied; the conditions and results are collated in Table IV below.

Mixture C: 0.167 g of ECH+62.1 g of POS S1+203.7 g of POS S4

Example 9

The experiment performed in Example 5 is repeated with an increase in the paper speed (100 m/min to 150 m/min). The conditions and results are collated in Table IV below.

Duplicate Example 7

10 mg (10 ppm of Pt) of Karstedt's catalyst prediluted in 3 ml of desulfurized toluene are added to 100 g of a mixture B of H68 and H48V750 oils and ECH (SiH/SiOH=20). After stirring, a thin layer of this mixture is applied; the conditions and results are collated in Table IV below.

Mixture B: 0.180 g of ECH+38.0 g of H68+247.8 g of H48V750

TABLE IV

| Example | Machine speed m/min | Speed of metering roll % | (2)Deposit of Oxford silicone g/m² | T° of sheet °C. | (3)Smear finger trace (A, B, C, D) | (4)Migration dewetting (1 to 10) | (6)Rub-off grip (1 to 10) | Comments |
|---|---|---|---|---|---|---|---|---|
| Ex. 6 | 100 | 13.0 | 1.22 | 147 | A | 10 | 10 | Rapid post-polymerization |
| Ex. 7 | 100 | 15.0 | 1.40 | 145 | A | 9/10 | 10 | Rapid post-polymerization |
| Ex. 8 | 100 | 13.0 | 1.15 | 145 | A | 9/10 | 10 | Rapid post-polymerization |
| Ex. 9 | 150 | 12.5 | 1.38 | 145 | A | 10 | 10 | |
| Dupl. Ex. 7 | 100 | 15.0 | 1.24 | 145 | D | 0 | / | Very slow post-polymerization |

(2) LAB X 1000 - APL/AAP/T116 N° 12088/LA 6 13 23
(3) Smear (finger trace) - APL/AAP/T106
A = no trace
B = barely visible trace
C = distinct trace
D = oily appearance
(4) Migration (test by dewetting) - APL/AAP/T244 Type "610" adhesive / SHERMAN ink, 31 dynes/cm
0 = very poor result
10 = very good result
(6) Rub-off - APL/AAP/T128
0 = very poor result
10 = very good result

What is claimed is:

1. A polymerizable siloxane composition crosslinkable by dehydrogenating condensation to give a product other than linear block copolyorganosiloxanes which comprises at least one ≡Si—Ar—Si≡ unit (where Ar=aromatic group), this composition comprising:

—A— at least one organosiloxane monomer, oligomer and/or polymer having at least one ≡SiH reactive unit per molecule;

—B— at least one organosiloxane monomer, oligomer and/or polymer having at least one ≡SiOH reactive unit per molecule;

—C— at least one metal catalyst;

—D— optionally at least one crosslinking inhibitor;

—E— optionally at least one polyorganosiloxane (POS) resin; and

—F— optionally at least one filler, wherein the catalyst —C— has formula (I) below:

$$IrX(L)(L')_2 \quad (I)$$

in which:

Ir is an iridium atom of valency I or III;

X is a ligand with one electron; and

L and L' independently are a ligand with two electrons.

2. The composition of claim 1, wherein the catalyst —C— has formular (I') below:

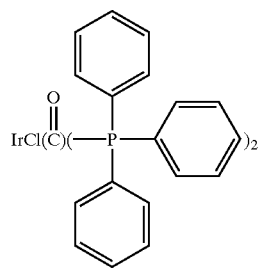

(I')

3. The composition of claim 1, wherein catalyst —C— is present in an amount between $1.10^{-6}$ and 5 parts by dry weight of organosiloxane monomer, oligomer and/or polymer to be reacted.

4. The composition of claim 1, wherein the organosiloxane monomers, oligomers and/or polymers —A— with ≡SiH reactive units possess at least one unit of formula (II) below and terminate with units of formula (III) below or cyclic units consisting of units of formula (II):

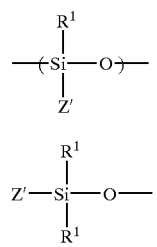

in which:

the symbols $R^1$ are identical or different and are:
a linear or branched alkyl radical containing 1 to 8 carbon atoms and optionally substituted by at least one halogen, an optionally substituted cycloalkyl radical containing between 5 and 8 cyclic carbon atoms, an optionally substituted aryl radical containing between 6 and 12 carbon atoms, or an aralkyl moiety having an alkyl moiety containing between 5 and 14 carbon atoms and an aryl moiety containing between 6 and 12 carbon atoms, and optionally substituted on the aryl moiety by halogens, alkyl radicals and/or alkoxy radicals containing 1 to 3 carbon atoms, and the symbols Z are similar or different and are:
a hydrogen radical, or
a group defined in the same way as $R^1$ above, with at least one of the symbols Z being H in each molecule.

5. The composition of claim 1, wherein the organosiloxane monomers, oligomers and/or polymers —B— with ≡SiOH reactive units possess at least one unit of formula (IV) below and terminate with units of formula (V) below or cyclic units consisting of units of formula (IV):

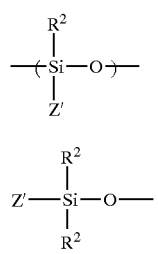

(IV)

(V)

in which:
the symbols $R^2$ are identical or different and are:
a linear or branched alkyl radical containing 1 to 8 carbon atoms and optionally substituted by at least one halogen, an optionally substituted cycloalkyl radical containing between 5 and 8 cyclic carbon atoms, an optionally substituted aryl radical containing between 6 and 12 carbon atoms, or an aralkyl moiety having an alkyl moiety containing between 5 and 14 carbon atoms and an aryl moiety containing between 6 and 12 carbon atoms, and optionally substituted on the aryl moiety by halogens, alkyl radicals and/or alkoxy radicals containing 1 to 3 carbon atoms, and the symbols Z' are similar or different and are:
a hydroxyl radical, or
a group defined in the same way as $R^2$ above, with at least one of the symbols Z' being OH in each molecule.

6. The composition of claim 1, wherein the organosiloxane monomers and polymers —A— with ≡SiH reactive units have general formula (VI):

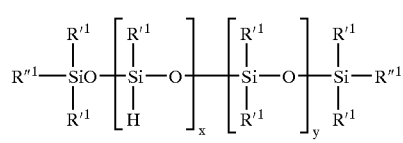

(VI)

in which:
x and y are each an integer or fraction varying between 0 and 200, and $R'^1$ and $R''^1$ independently of one another are:
a linear or branched alkyl radical containing 1 to 8 carbon atoms and optionally substituted by at least one halogen, an optionally substituted cycloalkyl radical containing between 5 and 8 cyclic carbon atoms, an optionally substituted aryl radical containing between 6 and 12 carbon atoms, or an aralkyl moiety having an alkyl moiety containing between 5 and 14 carbon atoms and an aryl moiety containing between 6 and 12 carbon atoms, and optionally substituted on the aryl moiety, it also being possible for $R''^1$ to be hydrogen, with the proviso that at least one of the radicals $R''^1$ are hydrogen when x=0.

7. The composition of claim 1, wherein the organosiloxane monomers, oligomers and polymers —B— with ≡SiOH reactive units have general formula (VII):

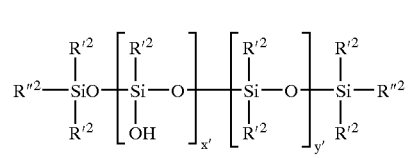

(VII)

in which:
x' and y' are each an integer or fraction varying between 0 and 1200, and $R'^2$ and $R''^2$ independently of one another are:
a linear or branched alkyl radical containing 1 to 8 carbon atoms and optionally substituted by at least one halogen, an optionally substituted cycloalkyl radical containing between 5 and 8 cyclic carbon atoms, an optionally substituted aryl radical containing between 6 and 12 carbon atoms, or an aralkyl moiety having an alkyl moiety containing between 5 and 14 carbon atoms and an aryl moiety containing between 6 and 12 carbon atoms, and optionally substituted on the aryl moiety, it also being possible for $R''^2$ to be OH, with the proviso that at least one of the radicals $R''^2$ are OH when x'=0.

8. The composition of claim 1, wherein the organosiloxane monomers, oligomers and polymers with ≡SiH reactive units contain from 1 to 50 ≡SiH active units per molecule.

9. The composition of claim 1, wherein the organosiloxane monomers, oligomers and polymers with ≡SiOH reactive units contain from 1 to 50 ≡SiOH active units per molecule.

10. The composition of claim 1, wherein the organosiloxane monomers, oligomers and polymers —A— with ≡SiH reactive units are selected from the compounds of the formulae

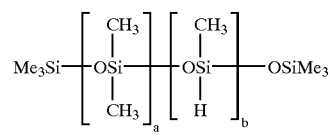

S1

-continued

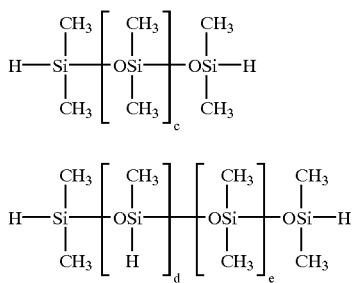
S2

S3 where a, b, c, d and e are numbers varying as follows:
in the polymer of formula S1:
$0 \leq a \leq 150$ and $1 \leq b \leq 55$
in the polymer of formula S2:
$0 \leq c \leq 15$
in the polymer of formula S3:
$5 \leq d \leq 200$ and $2 \leq e \leq 50$.

11. The composition of claim 1, wherein the organosiloxane monomers, oligomers and polymers —B— with ≡SiOH reactive units are selected from the compounds of the formula

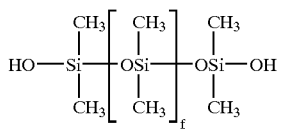
S4 where $1 \leq f \leq 1200$.

12. The composition of claim 1, wherein the ≡SiH/≡SiOH ratio is between 1 and 100.

13. A process for the polymerization and/or crosslinking of a siloxane composition comprising:
—A— at least one organosiloxane monomer, oligomer and/or polymer having at least one ≡SiH reactive unit per molecule;
—B— at least one organosiloxane monomer, oligomer and/or polymer having at least one ≡SiOH reactive unit per molecule;
—C— at least one metal catalyst;
—D— optionally at least one crosslinking inhibitor;
—E— optionally at least one polyorganosiloxane (POS) resin; and
—F— optionally at least one filler, wherein the compounds —A— and —B— are caused to undergo a dehydrogenating condensation with the aid of a catalyst —C— of formula (I) below:

IrX(L)(L')₂        (I)

in which:
Ir is an iridium atom of valency I or III;
X is a ligand with one electron; and
L and L' independently are a ligand with two electrons.

14. A process for the production of at least one non-stick coating on a substrate, consisting essentially of applying the composition of claim 1 to a substrate and then causing crosslinking to occur.

15. A process for the production of at least one article made of crosslinked silicone foam, consisting essentially of crosslinking a composition of claim 1 and ensuring that at least part of the gaseous hydrogen formed is not released from the reaction medium.

16. A coating obtained by the crosslinking (dehydrogenating condensation of a composition comprising:
at least one POS —A— selected from the compounds of the formulae

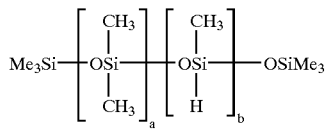
S1

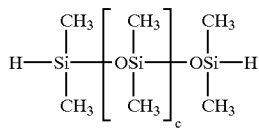
S2

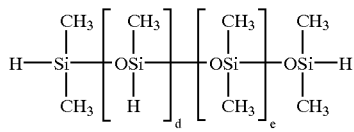
S3 where a, b, c, d and e are numbers varying as follows
in the polymer of formula S1:
$0 \leq a \leq 150$ and $1 \leq b \leq 55$
in the polymer of formula S2:
$0 \leq c \leq 15$
in the polymer of formula S3:
$5 \leq d \leq 200$ and $2 \leq e \leq 50$;
at least one POS —B— selected from the compounds of the formula

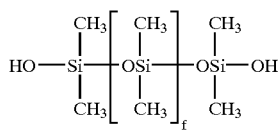
S4 where $1 \leq f \leq 1200$;
at least one metal catalyst —C— of formula (I) below:

IrX(L)(L')₂        (I)

in which:
Ir is an iridium atom of valency I or III;
X is a ligand with one electron; and
L and L' independently are a ligand with two electrons;
optionally at least one crosslinking inhibitor;
optionally at least one polyorganosiloxane (POS) resin; and
optionally at least one filler.

17. An article comprising a solid material, at least one surface of which is coated with a composition thermally crosslinked and/or polymerized by dehydrogenating condensation and comprising:
at least one POS —A— selected from the compounds of the formulae

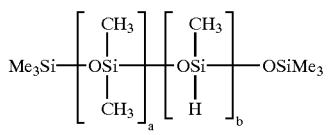

S1

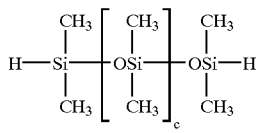

S2

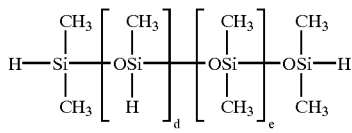

S3 where a, b, c, d and e are numbers varying as follows
in the polymer of formula S1:
$0 \leq a \leq 150$ and $1 \leq b \leq 55$
in the polymer of formula S2:
$0 \leq c \leq 15$
in the polymer of formula S3:
$5 \leq d \leq 200$ and $2 \leq e \leq 50$;

at least one POS —B— selected from the compounds of the formula

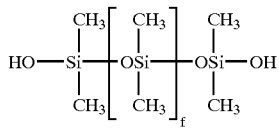

S4 where $1 \leq f \leq 1200$;

at least one metal catalyst —C— of formula (I) below:

 (I)

Ir is an iridium atom of valency I or III;
X is a ligand with one electron; and
L and L' independently are a ligand with two electrons;
optionally at least one crosslinking inhibitor;
optionally at least one polyorganosiloxane (POS) resin; and
optionally at least one filler.

18. Crosslinked silicone foam obtained by the crosslinking (dehydrogenating condensation) of a composition comprising:
at least one POS —A— selected from the compounds of the formulae

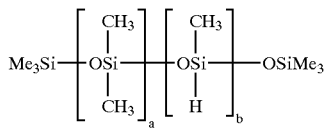

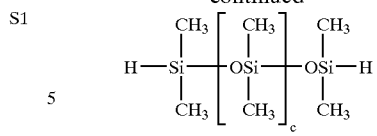

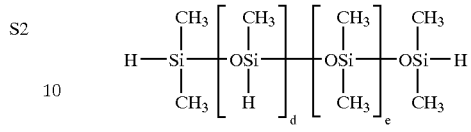

where a, b, c, d and e are numbers varying as follows
in the polymer of formula S1:
$0 \leq a \leq 150$ and $1 \leq b \leq 55$
in the polymer of formula S2:
$0 \leq c \leq 15$
in the polymer of formula S3:
$5 \leq d \leq 200$ and $2 \leq e \leq 50$;

at least one POS —B— selected from the compounds of the formula

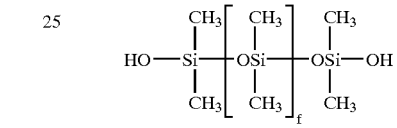

S4 where $1 \leq f \leq 1200$;

at least one metal catalyst —C— of formula (I) below:

 (I)

in which:
Ir is an iridium atom of valency I or III;
X is a ligand with one electron; and
L and L' independently are a ligand with two electrons;
optionally at least one crosslinking inhibitor;
optionally at least one polyorganosiloxane (POS) resin; and
optionally at least one filler.

19. The composition of claim 1, wherein X is a member selected from the group consisting of halogens, hydrogen, an acetate, a substituted or unsubstituted aromatic or heteroaromatic group, CN, RO, RS, $R_2N$ and $R_2P$, where R corresponds to an alkyl, aryl or arylalkyl unit.

20. The composition of claim 1, wherein L and L' are independently selected from the group consisting of:
hydrocarbon radicals comprising at least one unit

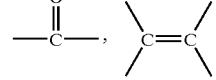

the radicals $—PR'_3$, $—P(OR')_3$, $R'_2O$, $R'_2S$, $R'_3N$, $=CR'_2$,
where R' independently is a substituted or unsubstituted aromatic or heteroaromatic group or an alkyl, aryl or arylalkyl radical; and
$C_nH_{n-1}$—, where n is a positive natural integer.

21. The composition of claim 20, wherein at least one of L and L' is $C_6H_5$—.

22. The composition of claim 3, wherein catalyst C is present in an amount between $1 \cdot 10^{-6}$ and $1 \cdot 10^{-3}$ parts by dry weight of organosiloxane monomer, oligomer and/or polymer to be reacted.

23. The composition of claim 6, wherein both of the radicals $R''^1$ are hydrogen when x is 0.

24. The composition of claim 7, wherein both of the radicals $R''^2$ are OH when x' is 0.

25. The process of claim 13, wherein X is a member selected from the group consisting of halogens, hydrogen, an acetate, a substituted or unsubstituted aromatic or heteroaromatic group, CN, RO, RS, $R_2N$ and $R_2P$, where R corresponds to an alkyl, aryl or arylalkyl unit.

26. The process of claim 13, wherein L and L' are independently selected from the group consisting of:
hydrocarbon radicals comprising at least one unit

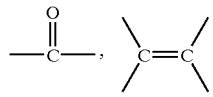

the radicals $-PR'_3$, $-P(OR')_3$, $R'_2O$, $R'_2S$, $R'_3N$, $\equiv CR'_2$, where R' independently is a substituted or unsubstituted aromatic or heteroaromatic group or an alkyl, aryl or arylalkyl radical; and $C_nH_{n-1}-$, where n is a positive natural integer.

27. The process of claim 26, wherein at least one of L and L' is $C_6H_5-$.

28. The process of claim 16, wherein X is a member selected from the group consisting of halogens, hydrogen, an acetate, a substituted or unsubstituted aromatic or heteroaromatic group, CN, RO, RS, $R_2N$ and $R_2P$, where R corresponds to an alkyl, aryl or arylalkyl unit.

29. The process of claim 16, wherein L and L' are independently selected from the group consisting of:
hydrocarbon radicals comprising at least one unit

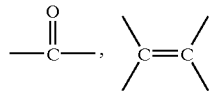

the radicals $-PR'_3$, $-P(OR')_3$, $R'_2O$, $R'_2S$, $R'_3N$, $=CR'_2$, where R' independently is a substituted or unsubstituted aromatic or heteroaromatic group or an alkyl, aryl or arylalkyl radical; and $C_nH_{n-1}-$, where n is a positive natural integer.

30. The process of claim 29, wherein at least one of L and L' is $C_6H_5-$.

31. The process of claim 17, wherein X is a member selected from the group consisting of halogens, hydrogen, an acetate, a substituted or unsubstituted aromatic or heteroaromatic group, CN, RO, RS, $R_2N$ and $R_2P$, where R corresponds to an alkyl, aryl or arylalkyl unit.

32. The process of claim 17, wherein L and L' are independently selected from the group consisting of:
hydrocarbon radicals comprising at least one unit

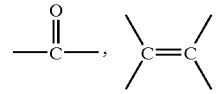

the radicals $-PR'_3$, $-P(OR')_3$, $R'_2O$, $R'_2S$, $R'_3N$, $=CR'_2$, where R' independently is a substituted or unsubstituted aromatic or heteroaromatic group or an alkyl, aryl or arylalkyl radical; and $C_nH_{n-1}-$, where n is a positive natural integer.

33. The process of claim 32, wherein at least one of L and L' is $C_6H_5-$.

34. The process of claim 18, wherein X is a member selected from the group consisting of halogens, hydrogen, an acetate, a substituted or unsubstituted aromatic or heteroaromatic group, CN, RO, RS, $R_2N$ and $R_2P$, where R corresponds to an alkyl, aryl or arylalkyl unit.

35. The process of claim 18, wherein L and L' are independently selected from the group consisting of:
hydrocarbon radicals comprising at least one unit

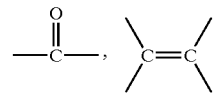

the radicals $-PR'_3$, $-P(OR')_3$, $R'_2O$, $R'_2S$, $R'_3N$, $=CR'_2$, where R' independently is a substituted or unsubstituted aromatic or heteroaromatic group or an alkyl, aryl or arylalkyl radical; and $C_nH_{n-1}-$, where n is a positive natural integer.

36. The process of claim 35, wherein at least one of L and L' is $C_6H_5-$.

* * * * *